United States Patent [19]

Thibodeau, Sr.

[11] 4,178,070
[45] Dec. 11, 1979

[54] BICYCLE SAFETY DEVICE

[76] Inventor: Robert W. Thibodeau, Sr., 17 Gendron La., Kennebunk, Me. 04043

[21] Appl. No.: 699,940

[22] Filed: Jun. 25, 1976

[51] Int. Cl.$^2$ .............................................. G02B 5/12
[52] U.S. Cl. ......................................... 350/99; 350/97
[58] Field of Search ................. 350/97, 105, 103–109, 350/288, 299; 301/37 SA, 37 R, 37 TA

[56] References Cited

U.S. PATENT DOCUMENTS

| 2,741,948 | 4/1956 | Parker | 350/99 |
| 3,528,721 | 9/1970 | LaLonde | 350/99 |
| 3,551,024 | 12/1970 | Priest | 350/99 |
| 3,684,347 | 8/1972 | Challe et al. | 301/37 SA |
| 3,768,433 | 10/1973 | Dian et al. | 350/97 |
| 3,894,786 | 7/1975 | Nagel | 350/102 |
| 3,895,855 | 7/1975 | Nagel | 350/103 |

FOREIGN PATENT DOCUMENTS 216289  11/1941  Switzerland ............................. 350/99

Primary Examiner—John K. Corbin
Assistant Examiner—B. W. de los Reyes
Attorney, Agent, or Firm—Joseph Zallen

[57] ABSTRACT

A pair of reflector assemblies are mounted on opposite sides of a bicycle wheel with their reflective surface being transversed to the length of the bicycle. Each assembly has back-to-back reflective surfaces of two selected, different colors, as for example red and amber. When the wheels spin, illumination from the front or rear produces a sharp flashing or stroboscopic effect.

6 Claims, 5 Drawing Figures

U.S. Patent  Dec. 11, 1979  4,178,070

BICYCLE SAFETY DEVICE

BACKGROUND OF INVENTION

This invention relates to bicycle safety and in particular to the use of reflector assemblies in making bicyclists visible at night.

Reflector assemblies have been described which attach to two adjacent spokes of a wheel with lateral reflection surfaces. As a wheel with such a reflector rotates light from the side gives the effect of a rotating spot. Although such reflector assemblies do provide an increased measure to bicycle safety over those which have no such assemblies, they have a number of deficiencies. One is that a rotating spot often does not provide a sufficient visual signal. Another is that such rotating spots are barely visible if at all when a motor vehicle approaches the rear of a bicyclist.

One object of the present invention is to provide a bicycle safety device which utilizes reflector assemblies and provides an improved visual signal.

A further object of this invention is to provide such a device which provides an improved visual signal from the rear.

Further objects and aids of this invention will be apparent from the description and claims which follow taken together with the appended drawings.

A BRIEF DESCRIPTION OF DRAWINGS

Figure 1:
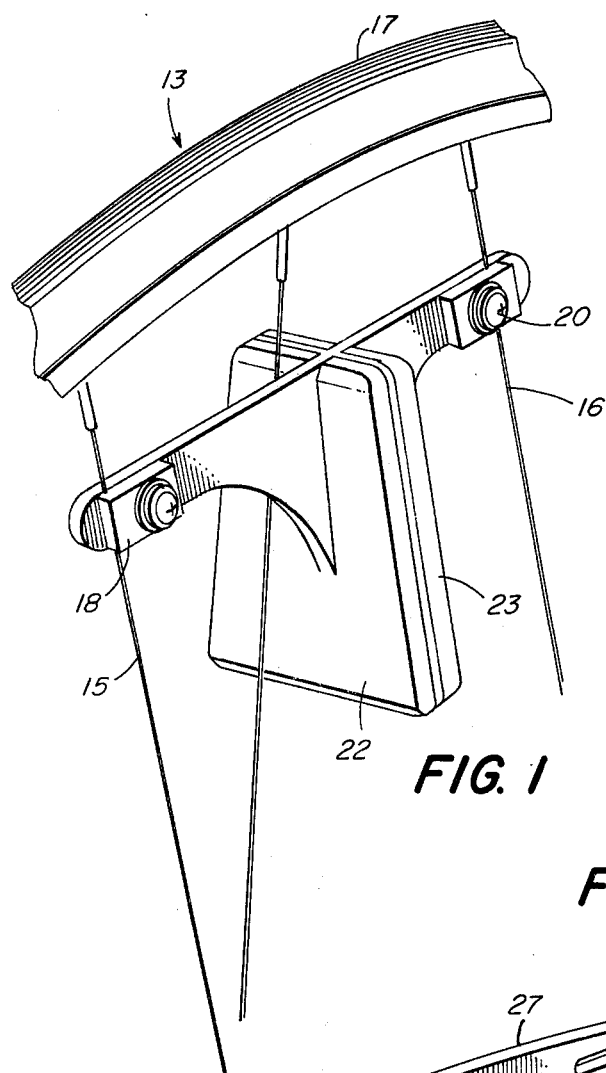

FIG. 1. is partial enlarged perspective view showing a reflector assembly mounted into adjacent spokes of a bicycle wheel.

Figure 2:
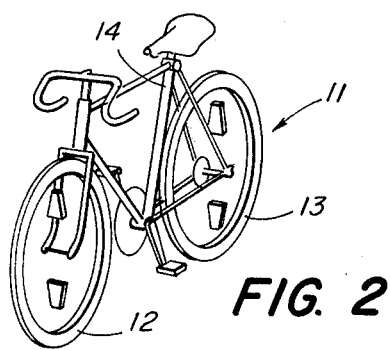

FIG. 2. is a schematic illustration showing the general appearance of reflector assemblies on the bicycle.

Figure 3:
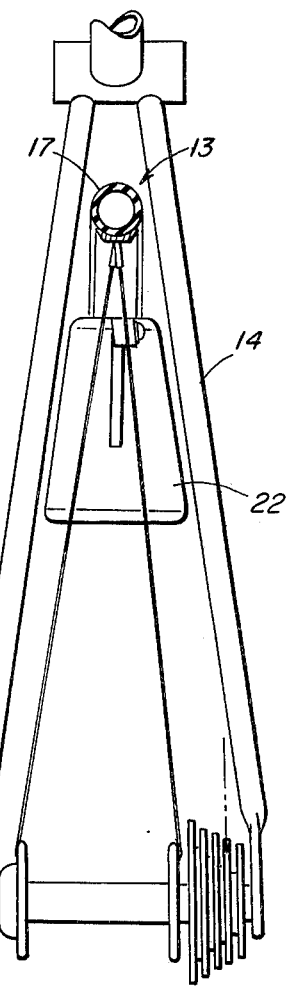

FIG. 3. is a rear view of a portion of the bicycle showing a reflector assembly mounted on two adjacent spokes.

Figure 4:
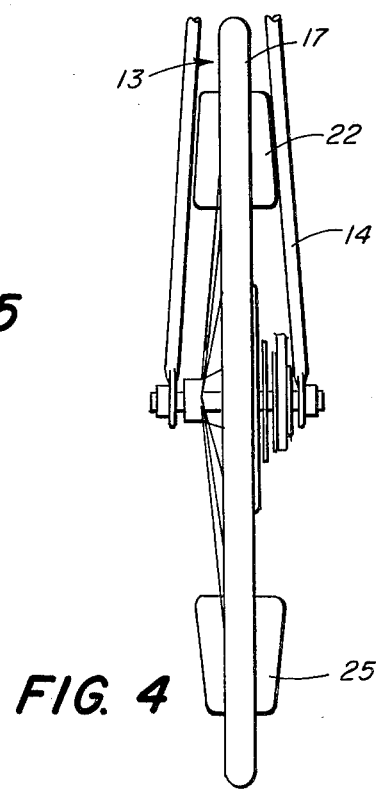

FIG. 4. is a rear view of a rear wheel of a bicycle showing two reflector assemblies in position.

Figure 5:
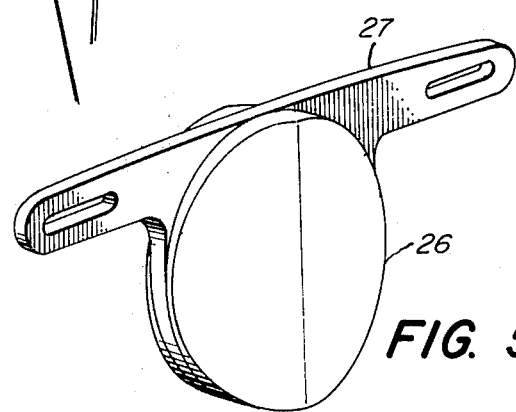

FIG. 5. is an illustration of a lateral reflector assembly of the prior art.

SUMMARY OF INVENTION

The present invention comprises generally the use on at least one wheel of a bicycle of a pair of reflector assemblies mounted with their reflective surfaces being transverse to the length of the bicycle. Each reflector assembly comprises back-to-back reflective surfaces of two selected different colors. Two such assemblies are mounted on a wheel directly opposite one another so that at any given instant the reflective surface visible from a given direction is one color on one assembly and the second color on the other assembly. The assemblies are preferably mounted on adjacent spokes near the periphery of the wheel. Typical pairs of contrasting reflective surface colors are red and amber, and red and white.

When the wheels spin, illumination from the front or rear of the bicycle produces a sharp flashing or stroboscopic effect, which effect is clearly visible even though the illumination of the reflectors is low. This flashing effect enables a visual signal of the presence of the bicyclist to be provided to an oncoming driver of an automobile at far greater distances than has hitherto been possible with prior art devices.

SPECIFIC EXAMPLE OF INVENTION

Referring now to the drawings as illustrated therein a bicycle 11 has reflectors attached to both the front and rear wheels in accordance with this invention. Bicycle 11 has a front wheel 12, a rear wheel 13 and frame 14. Mounted on two adjacent spokes 15 and 16 of rear wheel 13 near to the tire 17 is a bracket 18 attached by screws 19 and 20 and holding a reflector assembly 21. Reflector assembly 21 comprises a reflector plate 22 of red color and a reflector plate 23 of amber color mounted back-to-back and perpendicular to the bracket 18. Directly opposite and on the other side of the wheel 13 a similar bracket is mounted across the adjacent spokes and holds a similar reflector assembly having a red reflective plate mounted back-to-back with an amber reflector plate 25. Thus at any given instant, as illustrated in FIG. 4, a view from the rear of the wheel will show one amber reflector plate 25 and one red reflector plate 22 directly opposite.

As the wheels turn the alternating red and amber reflective surfaces produce a unique flashing or stroboscopic effect when illuminated by light from the rear. This flashing effect provides a very sharp and visible signal when the headlights of an automobile illuminate the bicycle, even at great distances, thus providing an earlier warning than previously described devices. The prior art device described in FIG. 2, which is a reflector plate 26 mounted by bracket 27 across adjacent spokes of a bicycle wheel has its reflector surface facing sideways and is visible only when there is sufficient side lighting and the automobile approaches from the side. Further, even when illuminated, lateral reflectors such as reflector 26 have a steady light intensity which is often not discernible until the light source is close to the bicycle.

In addition to the reflectors being mounted on the rear wheel, they can in addition be mounted on the front wheel wherein each wheel provides its own flashing effect. Where reflectors are mounted on the front wheel as well as the rear wheel it is preferred that the reflector assemblies on the front wheel be red and white back-to-back and the reflectors on the rear wheel be red and amber back-to-back so as to delineate the orientation of the bicycle.

It is clear that although reference to direction of illumination has been confined to rear illumination, that this invention works equally well when the illumination is from the front. The use of a different coloration in each wheel informs the driver of the automobile approaching the bicycle the direction in which the bicycle is going.

I claim:

1. A bicycle safety device comprising a pair of reflector assemblies mounted at substantially diametrically opposed positions on a wheel; each said assembly being mounted near the periphery of the wheel; each reflector assembly being characterized as having a reflector surface facing rearwardly and a reflector surface facing forwardly; each said reflector surface extending outwardly on both sides of the wheel; the rearward and forward facing reflector surfaces of each assembly being of different and contrasting colors with both rearward facing reflectors being of one color and both forward facing reflectors being of the different and contrasting color; said device being so characterized that when said wheel spins, a flashing effect is observed when there is incident light from the rear or front as a result of the reflection of rapidly alternating contrasting colors; said device being further characterized in that the flashing effect is clearly visible even when illumination of the reflective surfaces is low so as to provide a visible signal from the headlights of an automobile at a great distance.

2. The bicycle safety device of claim 1 wherein said assemblies are mounted on the rear wheel.

3. The bicycle safety device of claim 1 wherein a pair of said assemblies are mounted on each wheel.

4. The bicycle safety device of claim 3 wherein the reflector surfaces of one pair have at least one different color than the reflective surfaces of said second pair.

5. The bicycle safety device of claim 1 wherein said first color is red and said second color is amber.

6. The bicycle safety device of claim 1 wherein said first color is red and said second color is white.

* * * * *